(12) United States Patent
Kawakami et al.

(10) Patent No.: US 7,454,291 B2
(45) Date of Patent: Nov. 18, 2008

(54) DRIVING CONTROL APPARATUS

(75) Inventors: Seiji Kawakami, Susono (JP); Satoru Niwa, Susono (JP); Katsuhiko Iwazaki, Numazu (JP); Hiroaki Kataoka, Susono (JP); Chumsamutr Rattapon, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 781 days.

(21) Appl. No.: 11/135,287

(22) Filed: May 24, 2005

(65) Prior Publication Data

US 2005/0267684 A1 Dec. 1, 2005

(30) Foreign Application Priority Data

Jun. 1, 2004 (JP) ............................. 2004-163420

(51) Int. Cl.
*G06F 17/10* (2006.01)
(52) U.S. Cl. ..................... 701/301; 701/41; 701/96
(58) Field of Classification Search ................. 701/36, 701/41–43, 96, 200–213, 300, 301; 180/167–169
See application file for complete search history.

(56) References Cited

U.S. PATENT DOCUMENTS

| | | | |
|---|---|---|---|
| 5,245,422 A | 9/1993 | Borcherts et al. | |
| 5,765,116 A | 6/1998 | Wilson-Jones et al. | |
| 6,370,471 B1 | 4/2002 | Lohner et al. | |
| 6,853,884 B2 * | 2/2005 | Sadano ........................ | 701/1 |
| 7,317,973 B2 * | 1/2008 | Dieterle ....................... | 701/23 |
| 2002/0133285 A1 | 9/2002 | Hirasago | |

FOREIGN PATENT DOCUMENTS

| | | |
|---|---|---|
| EP | 1 074 904 A1 | 2/2001 |
| JP | A 7-104850 | 4/1995 |
| JP | A 7-105498 | 4/1995 |
| JP | A 2001-10518 | 1/2001 |
| JP | A 2002-219970 | 8/2002 |
| JP | A 2003-026025 | 1/2003 |

\* cited by examiner

*Primary Examiner*—Richard M. Camby
(74) *Attorney, Agent, or Firm*—Oliff & Berridge, PLC

(57) ABSTRACT

A driving control apparatus of the present invention has a driving road keeping device for providing a torque to a steering mechanism so as to keep a vehicle traveling at a predetermined position on a driving road, a setting device for setting a need or no need for execution of a control of the driving road keeping device, and a cruise control device for controlling a driving force or speed of the vehicle so as to keep the vehicle in a predetermined driving state. A need or no need for execution of the control of the driving road keeping device is determined based on a setting state of the setting device and a control state of the cruise control device. A display indicating that the control of the driving road keeping device is ready is presented when the control of the driving road keeping device is in an executable state upon a state change of either the setting state of the setting device or the control state of the cruise control device. Therefore, with the display indicating the ready state, a driver can initiate the control of the driving road keeping device by changing the setting state of the setting device or the control state of the cruise control device in accordance with the content of the display.

18 Claims, 11 Drawing Sheets

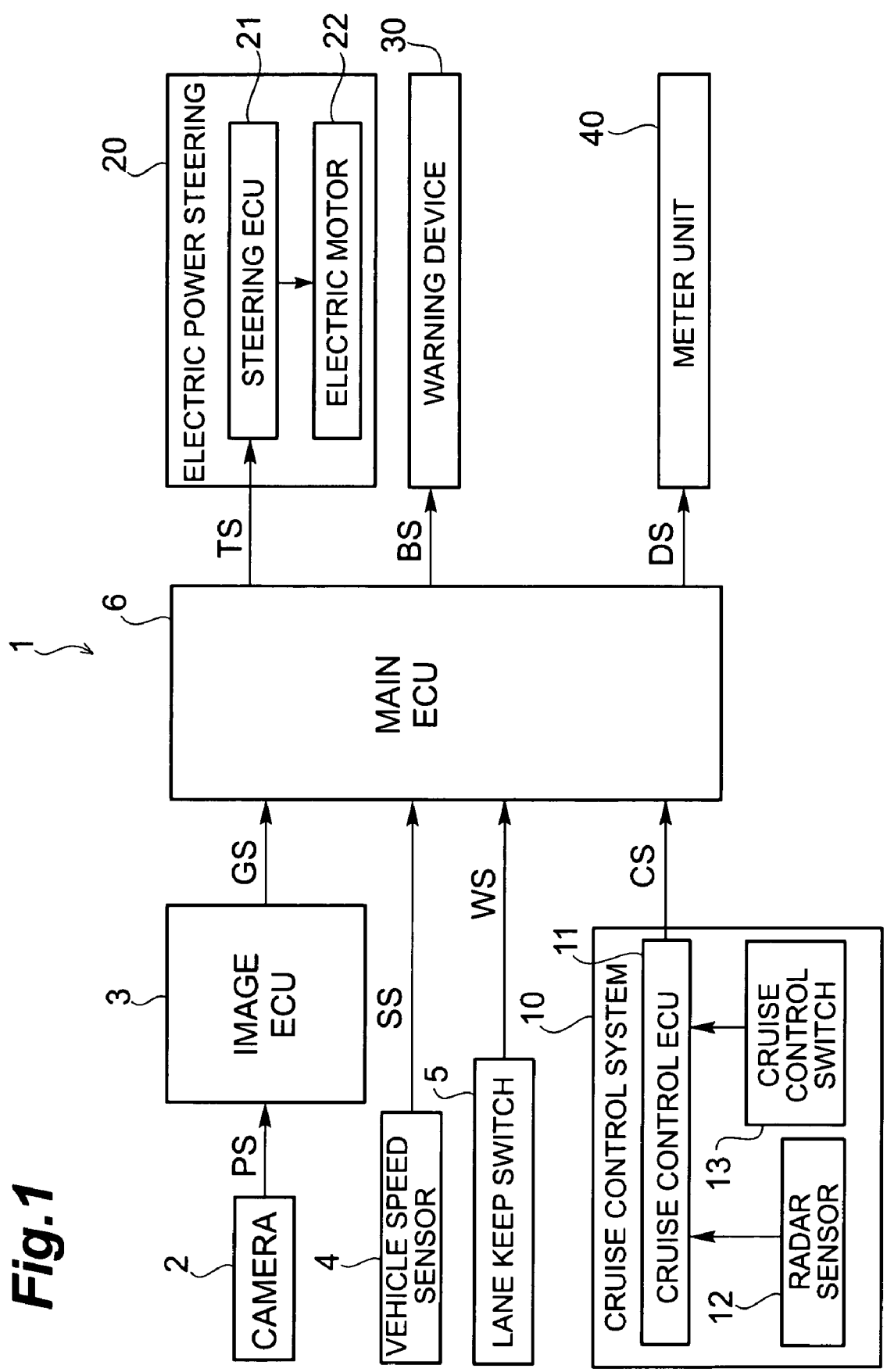

Fig.2

| OPERATION STATUS OF LANE KEEPING DEVICE | ACTIVATION CONDITIONS | | | |
|---|---|---|---|---|
| | LANE KEEP SWITCH | OPERATION STATUS OF CRUISE CONTROL SYSTEM | WITHIN ACTIVATION PERMITTING SPEED RANGE OF LANE DEPARTURE WARNING FUNCTION | WITHIN ACTIVATION PERMITTING SPEED RANGE OF LANE-KEEP ASSIST FUNCTION |
| DEACTIVATION | OFF | INACTIVE | ○ | — |
| | ON | INACTIVE | × | — |
| ACTIVATION OF LANE DEPARTURE WARNING FUNCTION | ON | INACTIVE | ○ | — |
| | ON | ACTIVE | ○ | × |
| ACTIVATION OF LANE-KEEP ASSIST FUNCTION | ON | ACTIVE | — | ○ |

DRIVING CONTROL APPARATUS

BACKGROUND OF THE INVENTION

1. Field of the Invention

The present invention relates to a driving control apparatus (method) having a lane keeping function.

2. Related Background of the Invention

A variety of driving control (support) apparatus (method) have been developed heretofore in order to support driver's driving. An example of the driving control apparatus is one having the lane keeping function of providing such an additional steering force as to keep a vehicle traveling near a center of a lane in order to support a driver's steering operation (Japanese Patent Application Laid-Open No. 7-104850). Another example of the driving control apparatus is one having a lane departure warning function of encouraging the driver to perform a steering operation to avoid a departure by an issue of a buzzer sound and/or a display of a warning with possibilities of a departure of the vehicle from a lane. In addition, still another example of the driving control apparatus is one having a cruise control function of providing such an additional braking force or driving force as to keep a vehicle speed set by the driver or as to track a preceding vehicle, in order to support a driver's brake operation or acceleration operation.

SUMMARY OF THE INVENTION

The lane keeping function and the lane departure warning function are functions to keep the vehicle unlikely to depart from a lane, and are sometimes constructed in the form of a single lane keeping device. This lane keeping device is sometimes configured to be switched on or off by a switch and to automatically switch between the lane keeping function and the lane departure warning function on the vehicle side with the switch being on. Furthermore, there are vehicles provided with the lane keeping device and the cruise control device. There are some cases where the lane keeping device in this structure is configured to automatically switch between the lane keeping function and the lane departure warning function in conjunction with working situations of the cruise control device. In such cases, the driver is unable to recognize how the two functions are switched or whether it is possible to switch the presently active function to the other function presently inactive. Particularly, there are cases where the driver desires to activate the lane keeping function in order to alleviate the steering operation, but the driver is unable to recognize whether the lane keeping function is in a state in which it can be activated. An object of the present invention is therefore to provide a driving control apparatus having at least the lane keeping function, which enables easy recognition of the present status of the function, whether the lane keeping function is in a ready state.

A driving control apparatus according to the present invention is an apparatus comprising: driving road keeping means for providing a torque to a steering mechanism so as to keep a vehicle traveling at a predetermined position on a driving road; setting means for setting a need or no need for execution of a control of the driving road keeping means; and cruise control means for controlling a driving force or speed of the vehicle so as to keep the vehicle in a predetermined driving state, wherein a need or no need for execution of the control of the driving road keeping means is determined based on a setting state of the setting means and a control state of the cruise control means. In addition, when the control of the driving road keeping means is in an executable state upon a state change of either the setting state of the setting means or the control state of the cruise control means, a display indicating a ready state of the control of the driving road keeping means is presented.

This driving control apparatus has the driving road keeping means, and the setting means sets a need or no need for execution of the control of the driving road keeping means. In addition, the vehicle with the driving control apparatus is also equipped with the cruise control means for controlling the driving force or speed of the vehicle so as to keep the vehicle in the predetermined driving state (e.g., driving at a vehicle speed set by the driver, or driving to track a preceding vehicle). In this driving control apparatus, a need or no need for execution of the control of the driving road keeping means is determined based on the setting state of the setting means and the control state of the cruise control means. For this reason, whether the control of the driving road keeping means can be initiated is determined by the setting state of the setting means and the control state of the cruise control means.

Then the driving control apparatus presents the display indicating that the control of the driving road keeping means is ready to start, when the control of the driving road keeping means is in the ready state upon a change of the setting state of the setting means or the control state of the cruise control means. Therefore, with the display indicating the ready state, the driver is able to initiate the control of the driving road keeping means by changing the setting state of the setting means or the control state of the cruise control means in accordance with the content of the display. In this manner, the driving control apparatus enables easy recognition as to whether the driving road keeping means is in the ready state.

The driving road is, for example, a lane on which the vehicle is now traveling, or, in the case without a lane, the road itself on which the vehicle is now traveling. The predetermined position on the driving road is, for example, a position near a center axis of the driving road (lane). The state of the cruise control means is, for example, an on/off state of a switch for determining whether the cruise control means is to be activated, a state of a RESUME switch for determining whether the cruise control means is to be resumed, or a setting state of a target speed.

Preferably, the executable state of the control of the driving road keeping means upon the state change of either the setting state of the setting means or the control state of the cruise control means is a state in which the setting means selects a need for execution of the control of the driving road keeping means and in which a setting switch for setting a need or no need for activation of the cruise control means is off (the control of the cruise control means is inactive), and state in which the driving road keeping means is in the executable state with execution of the control of the cruise control means.

The cruise control means is provided with the setting switch for setting a need or no need for activation, and is activated with the setting switch being on. In the driving control apparatus, the control of the driving road keeping means can be initiated in the state in which the setting means selects a need for execution of the control of the driving road keeping means and in which the setting switch of the cruise control means is off, and state in which the driving road keeping means is in the executable state with execution of the control of the cruise control means, and the display indicating the ready state is presented. The driver turns the setting switch of the cruise control means on (to initiate the control of the cruise control means) in accordance with the content of the display, whereupon the driving control apparatus initiates the control of the driving road keeping means. The executable state of the driving road keeping means with execution of the control of the cruise control means is, for example, a state in which a target speed of the cruise control satisfies a vehicle speed condition of the driving road keeping means, or a state in which an actual vehicle speed satisfies the vehicle speed condition of the driving road keeping means.

Preferably, the executable state of the control of the driving road keeping means upon the state change of either the setting state of the setting means or the control state of the cruise control means is a state in which the setting means sets no need for execution of the control of the driving road keeping means and in which the cruise control means is active, and state in which the driving road keeping means is executable.

The control of the driving road keeping means can be initiated in the state in which the setting means sets no need for execution of the control of the driving road keeping means and in which the cruise control means is active, and state in which the driving road keeping means is in the executable state, and the display indicating the ready state is presented. The driver selects execution of the control of the driving road keeping means through the setting means in accordance with the content of the display, whereupon the driving control apparatus initiates the control of the driving road keeping means.

The control of the driving road keeping means can be one to be executed within an activation speed region thereof, and the executable state of the control of the driving road keeping means upon the state change of either the setting state of the setting means or the control state of the cruise control means can be a state in which the setting means sets a need for execution of the control of the driving road keeping means and in which a setting switch for setting a need or no need for activation of the cruise control means is on, and state in which a target speed of the cruise control means is off the activation speed region of the driving road keeping means.

The cruise control means is provided with the setting switch for setting a need or no need for activation, and is activated with the setting switch being on. In the driving control apparatus, the control of the driving road keeping means is executed when the setting means selects a need for execution of the control of the driving road keeping means and when the vehicle speed is within the activation speed region with the setting switch of the cruise control means being on. For this reason, the driving control apparatus can initiate the control of the driving road keeping means when the setting means selects a need for execution of the control of the driving road keeping means, when the setting switch of the cruise control means is on (the control of the cruise control means is active), and when the target vehicle speed is off the activation speed region of the driving road keeping means, and the apparatus displays the ready state. The driver changes the target vehicle speed of the cruise control means into the activation speed region of the driving road keeping means in accordance with the content of the display, whereupon the driving control apparatus initiates the control of the driving road keeping means. Since the cruise control means controls the driving force or vehicle speed toward the target vehicle speed, the actual vehicle speed converges toward the target vehicle speed in the vehicle equipped with the cruise control means.

A driving control method according to the present invention is performing driving road keeping control for providing a torque to a steering mechanism so as to keep a vehicle traveling at a predetermined position on a driving road and cruise control for controlling a driving force or speed of the vehicle so as to keep the vehicle in a predetermined driving state, wherein a need or no need for execution set by setting means for setting a need or no need for execution of a control of the driving road keeping control is determined based on a setting state of the setting means and a control state of the cruise control means. In addition, when the driving road keeping control is in an executable state upon a state change of either the setting state of the setting means or the control state of the cruise control, a display indicating a ready state of the driving road keeping control is presented.

This driving control method performs the driving road keeping control, and the setting means sets a need or no need for execution of the driving road keeping control. In addition, the driving control method also performs the cruise control for controlling the driving force or speed of the vehicle so as to keep the vehicle in the predetermined driving state (e.g., driving at a vehicle speed set by the driver, or driving to track a preceding vehicle). And a need or no need for execution of the driving road keeping control is determined based on the setting state of the setting means and the control state of the cruise control. For this reason, whether the driving road keeping control can be initiated is determined by the setting state of the setting means and the control state of the cruise control.

Then the driving control method presents the display indicating that the driving road keeping control is ready to start, when the driving road keeping control is in the ready state upon a change of the setting state of the setting means or the control state of the cruise control. Therefore, with the display indicating the ready state, the driver is able to initiate the driving road keeping control by changing the setting state of the setting means or the control state of the cruise control in accordance with the content of the display. In this manner, the driving control method enables easy recognition as to whether the driving road keeping control is in the ready state.

The driving road is, for example, a lane on which the vehicle is now traveling, or, in the case without a lane, the road itself on which the vehicle is now traveling. The predetermined position on the driving road is, for example, a position near a center axis of the driving road (lane). The state of the cruise control means is, for example, an on/off state of a switch for determining whether the cruise control means is to be activated, a state of a RESUME switch for determining whether the cruise control means is to be resumed, or a setting state of a target speed.

Preferably, the executable state of the driving road keeping control upon the state change of either the setting state of the setting means or the control state of the cruise control is a state in which the setting means selects a need for execution of the driving road keeping control and in which a setting switch for setting a need or no need for activation of the cruise control is off (the cruise control is inactive), and state in which the driving road keeping control is in the executable state with execution of the cruise control.

The cruise control is provided with the setting switch for setting a need or no need for activation, and is activated with the setting switch being on. In the driving control method, the driving road keeping control can be initiated in the state in which the setting means selects a need for execution of the driving road keeping control and in which the setting switch of the cruise control is off, and state in which the driving road keeping control is in the executable state with execution of the cruise control, and the display indicating the ready state is presented. The driver turns the setting switch of the cruise control on (to initiate the cruise control) in accordance with the content of the display, whereupon the driving road keeping control is initiated. The executable state of the driving road keeping control with execution of the cruise control is, for example, a state in which a target speed of the cruise control satisfies a vehicle speed condition of the driving road keeping control, or a state in which an actual vehicle speed satisfies the vehicle speed condition of the driving road keeping control.

Preferably, the executable state of the driving road keeping control upon the state change of either the setting state of the setting means or the control state of the cruise control is a state in which the setting means sets no need for execution of the driving road keeping control and in which the cruise control is active, and state in which the driving road keeping control is executable.

The driving road keeping control can be initiated in the state in which the setting means sets no need for execution of the driving road keeping control and in which the cruise control is active, and state in which the driving road keeping control is in the executable state, and the display indicating the ready state is presented. The driver selects execution of the driving road keeping control through the setting means in accordance with the content of the display, whereupon the driving road keeping control is initiated.

The driving road keeping control can be one to be executed within an activation speed region thereof, and the executable state of the driving road keeping control upon the state change of either the setting state of the setting means or the control state of the cruise control can be a state in which the setting means sets a need for execution of the driving road keeping control and in which a setting switch for setting a need or no need for activation of the cruise control is on, and state in which a target speed of the cruise control is off the activation speed region of the driving road keeping control.

The cruise control is provided with the setting switch for setting a need or no need for activation, and is activated with the setting switch being on. The driving road keeping control is executed when the setting means selects a need for execution of the driving road keeping control and when the vehicle speed is within the activation speed region with the setting switch of the cruise control being on. For this reason, the driving road keeping control can be initiated when the setting means selects a need for execution of the driving road keeping control, when the setting switch of the cruise control is on (the cruise control is active), and when the target vehicle speed is off the activation speed region of the driving road keeping control, and the ready state is displayed. The driver changes the target vehicle speed of the cruise control into the activation speed region of the driving road keeping control in accordance with the content of the display, whereupon the driving road keeping control is initiated. Since the cruise control controls the driving force or vehicle speed toward the target vehicle speed, the actual vehicle speed converges toward the target vehicle speed in the vehicle equipped with the cruise control.

BRIEF DESCRIPTION OF THE DRAWINGS

FIG. 1 is a configuration diagram of a lane keeping device according to an embodiment of the present invention.

FIG. 2 is a table showing activation conditions of a lane departure warning function and a lane-keep assist function in the lane keeping device.

DESCRIPTION OF THE PREFERRED EMBODIMENTS

An embodiment of the driving control apparatus (method) according to the present invention will be described below with reference to the drawings. In the present embodiment, the driving control apparatus according to the present invention is applied to a lane keeping device mounted on a vehicle equipped with a cruise control system. The lane keeping device according to the present embodiment has a lane departure warning function and a lane-keep assist function, and either one of the two functions can be activated by a lane keep switch.

Figure 3:
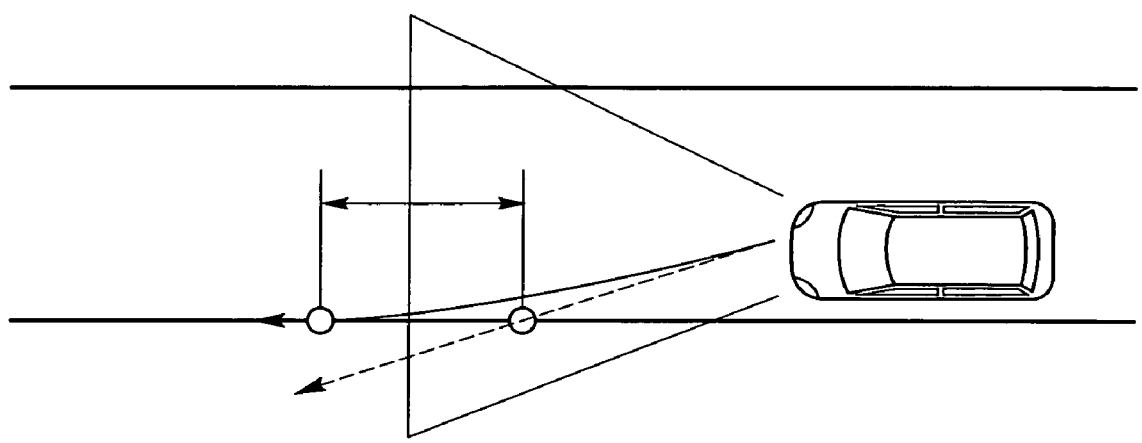
FIG. 3 is a drawing to illustrate the lane departure warning function in the lane keeping device.
Figure 4:
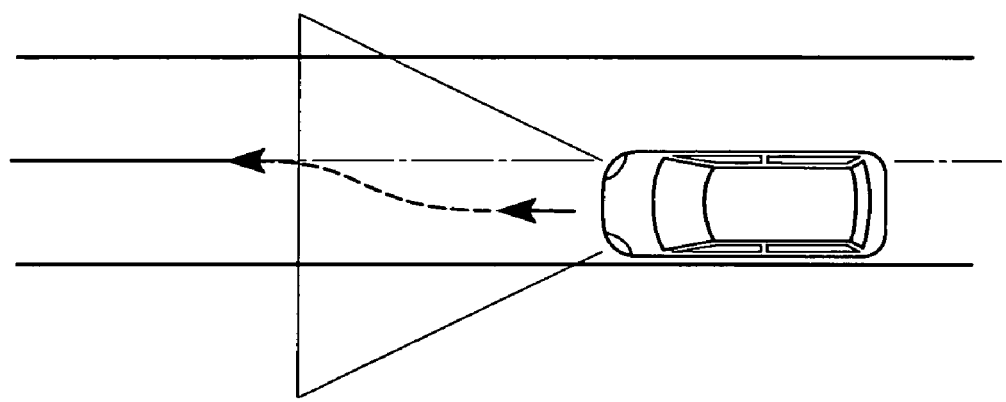
FIG. 4 is a drawing to illustrate the lane-keep assist function in the lane keeping device.
Figure 5:
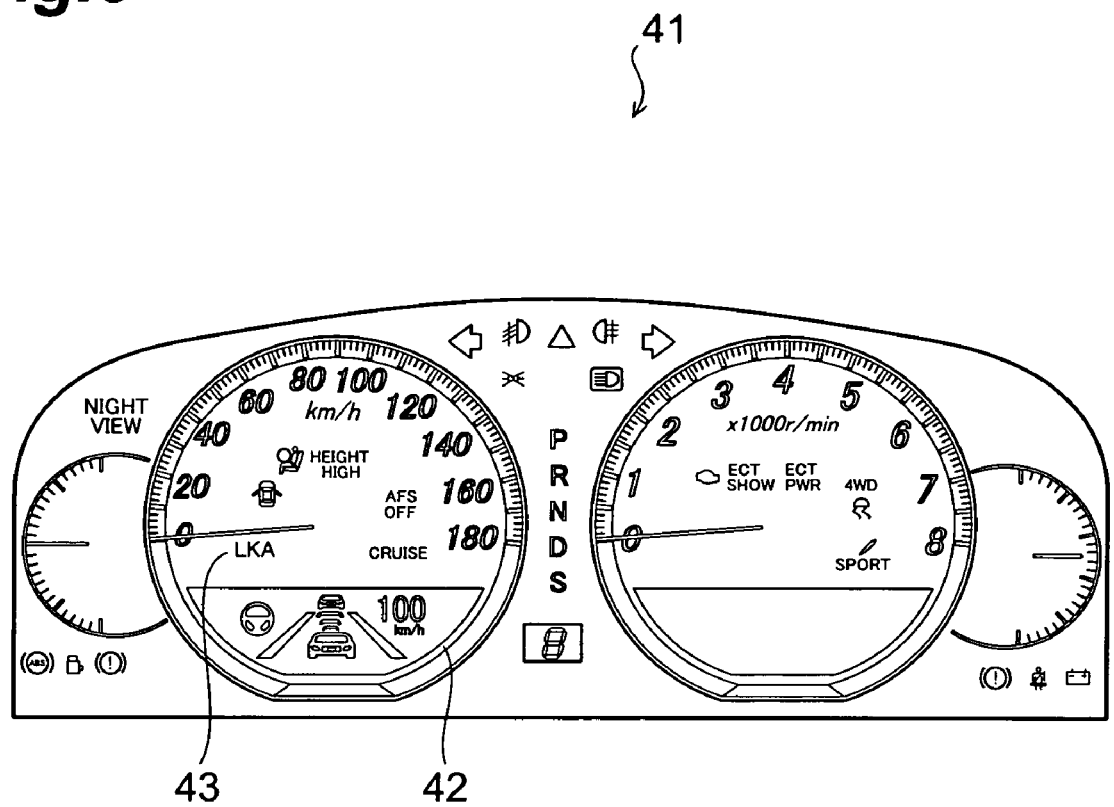
FIG. 5 is a front view of a combination meter of a meter unit.
Figure 6:
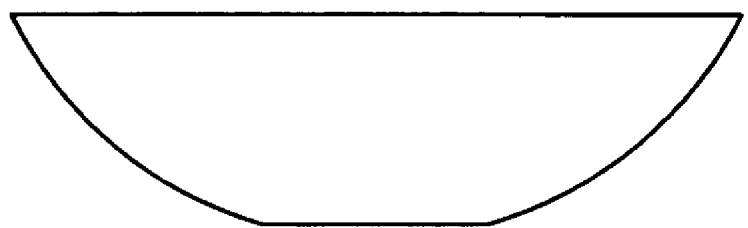
FIG. 6 shows an example of a display screen of a multi-display in a state in which the lane keeping device is inactive and in which a cruise control system is inactive.
Figure 7A:
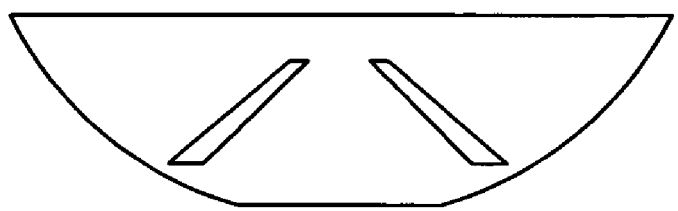
FIG. 7A shows an example of a display screen of the multi-display in a state in which the lane departure warning function is active and in which the cruise control system is inactive.
Figure 7B:
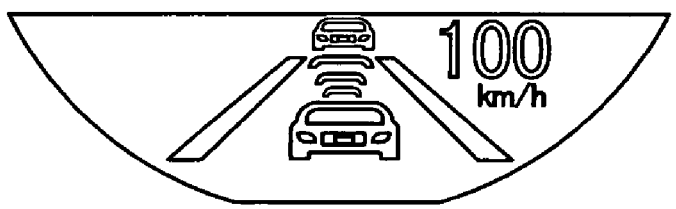
FIG. 7B shows an example of a display screen of the multi-display in a state in which the lane departure warning function is active and in which the cruise control system is active.
Figure 8A:
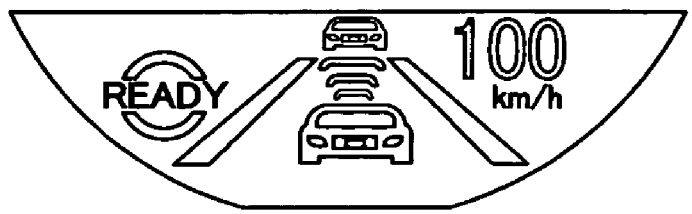
FIG. 8A shows an example of a display screen of the multi-display in a ready state of the lane-keep assist function (to be initiated with a lane keep switch being on).
Figure 8B:
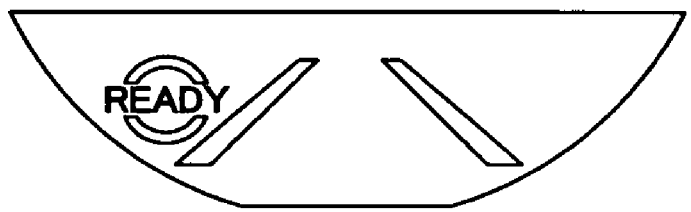
FIG. 8B shows an example of a display screen of the multi-display in the ready state of the lane-keep assist function (to be initiated when the cruise control system is activated at or above a set vehicle speed V3).
Figure 8C:
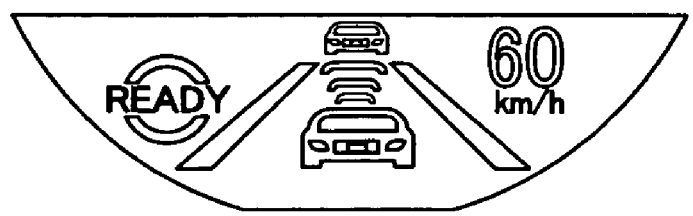
FIG. 8C shows an example of a display screen of the multi-display in the ready state of the lane-keep assist function (to be initiated when the set vehicle speed of the cruise control system is changed to V3 or above).
Figure 9:
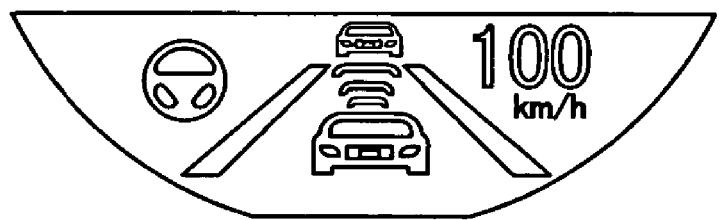
FIG. 9 shows an example of a display screen of the multi-display in an active state of the lane-keep assist function.

A configuration of lane keeping device 1 will be described with reference to FIGS. 1 to 9. FIG. 1 is a configuration diagram of the lane keeping device according to the present embodiment. FIG. 2 is a table showing the activation conditions of the lane departure warning function and the lane-keep assist function in the lane keeping device of FIG. 1. FIG. 3 is a drawing to illustrate the lane departure warning function in the lane keeping device. FIG. 4 is a drawing to illustrate the lane-keep assist function in the lane keeping device of FIG. 1. FIG. 5 is a front view of a combination meter of a meter unit shown in FIG. 1. FIG. 6 shows an example of a display screen of a multi-display in a state where the lane keeping device and the cruise control system both are inactive. FIGS. 7A and 7B show examples of display screens of the multi-display in an active state of the lane departure warning function. FIGS. 8A to 8C show examples of display screens of the multi-display in a ready state of the lane-keep assist function. FIG. 9 shows an example of a display screen of the multi-display in an active state of the lane-keep assist function.

The lane keeping device 1 has the lane departure warning function of providing various warnings with possibilities of a departure of a vehicle from a lane, and the lane-keep assist function of providing such an additional steering force as to keep the vehicle traveling near the center of the lane, in order to support driver's driving. When the lane keep switch is on, the lane keeping device 1 activates either one of the two functions, based on on/off of the cruise control system and the vehicle speed. Particularly, the lane keeping device 1 provides a display indicating working situations of the lane departure warning function and the lane-keep assist function, and a ready state of the lane-keep assist function, in order to notify the driver that the lane-keep assist function can be initiated by a driver's predetermined operation. For that, the lane keeping device 1 is provided with a camera 2, an image ECU [Electronic Control Unit] 3, a vehicle speed sensor 4, a lane keep switch 5, and a main ECU 6, and transmits and receives various signals to and from a cruise control system 10, an electric power steering 20, a warning device 30, and a meter unit 40.

The cruise control system 10 controls a brake actuator (not shown) and a throttle actuator (not shown) through cruise control ECU 11 to automatically adjust the vehicle speed so as to keep the vehicle traveling at a vehicle speed set by the driver (target vehicle speed). The cruise control system 10 detects the presence or absence of a preceding vehicle, a following distance from a preceding vehicle, or the like by means of a radar sensor 12, and, where there exists a preceding vehicle, it makes cruise control ECU 11 automatically adjust the vehicle speed or acceleration so as to track the preceding vehicle.

The cruise control system 10 is activated or deactivated according to a driver's on or off operation on cruise control switch 13, and a set vehicle speed is determined by a driver's setting operation on the cruise control switch 13. An activation permitting speed range is set for the set vehicle speed, and the cruise control system 10 is activated only when the set vehicle speed is set within this activation permitting speed range (i.e., when the set vehicle speed is not less than V5 and not more than V6). Furthermore, the cruise control system 10 restarts the cruise control function at the set speed before a stop, according to a driver's RESUME operation on the cruise control switch 13.

The cruise control ECU 11 transmits on/off information and target speed information of the cruise control system 10 as a cruise control signal CS to main ECU 6. Even if the cruise control switch 13 is on, the cruise control system 10 can be deactivated by a driver's braking operation, a failure, or the like. Since the cruise control system 10 is permitted to be activated within the activation permitting speed range thereof, it is deactivated when the actual vehicle speed becomes off the activation permitting speed range during execution of the cruise control.

The electric power steering 20 controls an electric motor 22 through steering ECU 21 to assist a driver's steering operation by a driving force of the electric motor 22. The steering ECU 21 sets an assist amount on the basis of a steering wheel torque given by a driver's steering operation, and controls driving of the electric motor 22 according to the assist amount. Particularly, when receiving a steering torque signal TS from main ECU 6, the steering ECU 21 sets the assist amount by adding a steering torque (steering force indicated by the steering torque signal TS) to be provided through the control by the lane keeping device 1, to the steering wheel torque by the driver's steering operation.

The warning device 30 issues a buzzer sound as a warning to the driver. When receiving a buzzer signal BS from main ECU 6, the warning device 30 emits a buzzer sound according to the buzzer signal BS. The meter unit 40 has a combination meter 41, and the combination meter 41 is provided with a multi-display 42, in addition to various meters and warning indications (cf FIG. 5). The multi-display 42 displays working situations of the lane keeping device 1 and the cruise control system 10. When receiving a display signal DS from main ECU 6, the meter unit 40 displays the working situation of the lane keeping device 1 on the multi-display 42 in accordance with the display signal DS, and indicates the status of the lane keeping device 1 by indicator lamp 43 (off: inactive, on: active, blink: failure). When receiving a display signal from the cruise control ECU 11, the meter unit 40 displays the working situation of the cruise control system 10 on the multi-display 42 in accordance with the display signal.

The contents of the display on the multi-display 42 will be described with reference to FIGS. 6 to 9. As shown in FIG. 6, a state without any display on the multi-display 42 indicates that the lane keeping device 1 and the cruise control system 10 both are inactive (including a deactivated state due to a failure). As shown in FIG. 7A and others, a state with a display of two white lines having an upward converging spacing in the central part of the multi-display 42 indicates that the lane keeping device 1 is active. As shown in FIG. 9, a state with a display of two white lines and with a display of a steering wheel mark beside these two white lines in the central part of the multi-display 42 indicates that the lane-keep assist function is active.

Therefore, the state with the display of two white lines only, without the display of the steering wheel mark, indicates that the lane departure warning function is active. In addition, a state with a display of a READY mark on the left side of the multi-display 42, as shown in FIG. 8, indicates a state in which the lane-keep assist function can be activated by a certain operation on the lane keeping device 1 or on the cruise control system 10 (a ready state). As shown in FIG. 7B and others, a state with a display of two vehicles and a cruise control mark consisting of radio waves from the rear vehicle thereof in the central part of the multi-display 42 indicates that the cruise control system 10 is active. During the display of this cruise control mark, the set vehicle speed of the cruise control is also displayed on the right side of the multi-display 42.

Accordingly, where the display signal DS indicates a stop of the lane keeping device 1 (including a failure case), the meter unit 40 displays neither the two white lines nor the steering wheel mark on the multi-display 42. Where the display signal DS indicates activation of the lane-keep assist function, the meter unit 40 displays the two white lines and the steering wheel mark on the multi-display 42. Where the display signal DS indicates activation of the lane departure warning function, the meter unit 40 displays the two white lines on the multi-display 42 (without the steering wheel mark).

Furthermore, where the display signal DS indicates the ready state of the lane-keep assist function, the meter unit 40 also displays the READY mark on the multi-display 42. In passing, where the display signal from the cruise control ECU 11 indicates activation of the cruise control, the meter unit 40 displays the cruise control mark and the set vehicle speed on the multi-display 42; on the other hand, where the display signal indicates deactivation of the cruise control, the meter unit 40 displays neither the cruise control mark nor the set vehicle speed on the multi-display 42.

The activation of the lane departure warning function involves two cases: a case where the cruise control system 10 is inactive (FIG. 7A); a case where the cruise control system 10 is active (FIG. 7B). On the other hand, the cruise control system 10 is always active with activation of the lane-keep assist function (FIG. 9). The ready state of the lane-keep assist function involves (1) a case where the lane keeping device 1 is inactive (cf FIG. 8A), (2) a case where the cruise control system 10 is inactive (FIG. 8B), (3) a case where the cruise control system 10 is active and where the set vehicle speed is off an activation permitting speed range of the lane-keep assist function (FIG. 8C), and so on.

The camera 2 is, for example, a CMOS [Complimentary Metal Oxide Semiconductor] camera, and is mounted in the front part of the vehicle equipped with the lane keeping device 1. On this occasion, the camera 2 is mounted so that the direction of its optical axis agrees with a traveling direction of the vehicle. The camera 2 takes an image of a forward road ahead the vehicle and acquires a color image thus taken (e.g., an image based on RGB [Red Green Blue]). The camera 2 transmits data of the taken image as a photograph signal PS to image ECU 3. The camera 2 has a wide image field in the lateral directions and is able to well photograph (a pair of) white lines on the left and right sides indicating a traveling lane. The camera 2 is a color camera herein, but it may also be a monochrome camera as long as it can acquire an image that permits recognition of white lines on a road.

The image ECU 3 is comprised of a CPU [Central Processing Unit], a ROM [Read Only Memory], a RAM [Random Access Memory], and so on. The image ECU 3 retrieves the photograph signal PS, and recognizes a pair of white lines indicating a lane on which the vehicle is traveling, from the photographic image data of the photograph signal PS. Then the image ECU 3 calculates a width of the lane, a line passing a center between a pair of white lines (i.e., a center line of the lane), and a radius of curvature and a curvature of the center line from the pair of white lines recognized. Furthermore, the image ECU 3 calculates an angular difference between the center line of the lane and the direction in which the camera 2 is directed (i.e., the traveling direction of the vehicle), and an offset amount of the vehicle from the center line of the lane. Then the image ECU 3 transmits to the main ECU 6 these information of the pair of white lines recognized and information thus calculated, as an image signal GS.

The vehicle speed sensor 4 is a sensor for detecting a speed of the vehicle on the basis of rotational speeds of wheels or the like. The vehicle speed sensor 4 transmits the detected speed information as a vehicle speed signal SS to the main ECU 6. The lane keep switch 5 is a switch for selecting (or setting) activation/deactivation of the lane keeping device 1 according to a driver's operation. The lane keep switch 5 transmits information about on/off selected by the driver, as a switch signal WS to the main ECU 6.

The main ECU 6 is comprised of a CPU, a ROM, a RAM, and so on. The main ECU 6 retrieves the image signal GS from the image ECU 3, the vehicle speed signal SS from the vehicle speed sensor 4, the switch signal WS from the lane keep switch 5, and the cruise control signal CS from the cruise control system 10 (cruise control ECU 11). Then the main ECU 6 determines activation/deactivation of the lane departure warning function and the lane-keep assist function, and, in a case where either of the functions is activated, it executes the control of the function. Furthermore, the main ECU 6 sets the various signals TS, BS according to the function under execution of the control, and transmits the various signals TS, BS to the electric power steering 20 (steering ECU 21) and to the warning device 30. In addition, the main ECU 6 determines the contents of the display on the multi-display 42 in accordance with the working situations of the lane departure warning function and the lane-keep assist function and the working situation of the cruise control system 10. Furthermore, the main ECU 6 sets a display signal DS according to the contents of the display determined and transmits the display signal DS to the meter unit 40.

A process of determining activation/deactivation of the lane departure warning function and the lane-keep assist function in the main ECU 6 will be described below with reference to FIG. 2. The main ECU 6 determines whether the lane keep switch 5 is on, based on the switch signal WS. When the lane keep switch 5 is off, the main ECU 6 deactivates the lane keeping device 1. When the lane keep switch 5 is on, the main ECU 6 determines whether the cruise control system 10 is active, based on the cruise control signal CS.

When the cruise control system 10 is inactive, the main ECU 6 determines whether the vehicle speed V is within the activation permitting speed range of the lane departure warning function (i.e., whether the vehicle speed V is not less than V1 and not more than V2), based on the vehicle speed signal SS. When the vehicle speed V is off the activation permitting speed range of the lane departure warning function (i.e., when the vehicle speed V is less than V1 or higher than V2), the main ECU 6 deactivates the lane keeping device 1. On the other hand, when the vehicle speed V is within the activation permitting speed range of the lane departure waning function (i.e., when the vehicle speed V is not less than V1 and not more than V2), the main ECU 6 activates the lane departure warning function.

When the cruise control system 10 is active, the main ECU 6 determines whether the set vehicle speed Vset of the cruise control is within the activation permitting speed range of the lane-keep assist function (i.e., whether the vehicle speed Vset is not less than V3 and not more than V4), based on the cruise control signal CS. In passing, when the cruise control system 10 is active, the vehicle is automatically adjusted so that the vehicle speed V becomes the set vehicle speed Vset; therefore, the determination is made using the set vehicle speed Vset herein. The above determination may be made using the actual vehicle speed V according to the vehicle speed signal SS, instead of the set vehicle speed Vset of the cruise control. In addition, the determination may also be made based on whether the set vehicle speed Vset and the actual vehicle speed V both are within the activation permitting speed range of the lane-keep assist function. However, $V1<V3$ and $V4<V2$; the activation permitting speed range of the lane-keep assist function is thus a speed range included in the activation permitting speed range of the lane departure warning function. In addition, $V5<V1<V3$ and $V6=V4<V2$, in the relation with the activation permitting speed range of the set speed of the cruise control system 10 (i.e., the set vehicle speed Vset is not less than V5 and not more than V6).

When the set vehicle speed Vset is off the activation permitting speed range of the lane-keep assist function (i.e., when the vehicle speed Vset is less than V3 or higher than V4), the main ECU 6 determines whether the set vehicle speed Vset is within the activation permitting speed range of the lane departure warning function, based on the cruise control signal CS. When the set vehicle speed Vset is off the activation permitting speed range of the lane departure warning function, the main ECU 6 deactivates the lane keeping device 1. The determination herein is also made using the set vehicle speed Vset, but the determination may also be made using the actual vehicle speed V according to the vehicle speed signal SS. In addition, the determination may also be made according to whether the set vehicle speed Vset and the actual vehicle speed V both are within the activation permitting speed range of the lane departure warning function. When the set vehicle speed Vset is within the activation permitting speed range of the lane departure warning function, the main ECU 6 activates the lane departure warning function. On the other hand, when the set vehicle speed Vset is within the activation permitting speed range of the lane-keep assist function (i.e., when the vehicle speed is not less than V3 and not more than V4), the main ECU 6 activates the lane-keep assist function.

Accordingly, the lane keeping device 1 is activated when the lane keep switch 5 is on and when the vehicle speed V is within the activation permitting speed range of the lane departure warning function. The lane-keep assist function is activated only when the cruise control system 10 is active and when the set vehicle speed Vset of the cruise control is within the activation permitting speed range of the lane-keep assist function, in a state in which the lane keeping device 1 is active. On the other hand, the lane departure warning function is activated when the lane-keep assist function is inactive, in a state in which the lane keeping device 1 is active. Therefore, if the cruise control system 10 is deactivated even with activation of the lane-keep assist function, the lane-keep assist function is deactivated and the lane departure warning function is activated.

If the set vehicle speed Vset of the cruise control becomes off the activation permitting speed range of the lane-keep assist function even with activation of the lane-keep assist function, the lane-keep assist function is deactivated and the lane departure warning function is activated. When the image ECU 3 fails to recognize white lines even with the lane keep switch 5 being on, the lane departure warning function and the lane-keep assist function are not activated, because the effects by the respective functions cannot be achieved even with activation of the lane departure warning function and the lane-keep assist function.

A process in the main ECU 6 during execution of the control of the lane departure warning function will be described with reference to FIG. 3. The lane departure warning function determines whether the vehicle can depart from a lane, based on a relative positional relation between the vehicle and the lane (a pair of white lines) during traveling of the vehicle. When the lane departure warning function determines that the vehicle can depart from the lane, it performs an operation of adding a steering force at a body-sensory warning level by making use of the electric power steering 20, an issue of a buzzer sound from the warning device 30, and a display of a warning on the multi-display 42 of the meter unit 40, in order to encourage the driver to perform a steering operation for avoiding the departure from the lane.

The steering force at the body-sensory warning level is a small steering force enough to make the driver aware that the steering force is added toward the center of the lane (the steering force added to the steering wheel by the vehicle). This steering force is of a small predetermined magnitude and is added only during a short period of time predetermined. In FIG. 3, a dashed arrow indicates a vehicular swept path of the vehicle without addition of the steering force, and a solid arrow a vehicular swept path of the vehicle with addition of the steering force by the lane departure warning function. The provision of this small steering force defers a departure of the vehicle from the lane, and the driver can return the vehicle toward the center of the lane by a steering operation during that period.

For that purpose, the main ECU 6 determines whether the vehicle can depart from the lane, based on the mutual relation between the direction of the camera 2 (i.e., the traveling direction of the vehicle) and the direction of a pair of white lines (or the center line of the lane), in consideration of the radius of curvature of the center line of the lane and the width of the lane. The main ECU 6 also determines the steering direction of the steering force added, based on the direction of the camera 2 and the direction of the pair of white lines.

When it is determined that the vehicle can depart from the lane, the main ECU 6 sets a steering torque signal TS indicating a steering torque (a steering direction of which is the direction determined) for generating the steering force at the body-sensory warning level, and transmits the steering torque signal TS to the electric power steering 20 (steering ECU 21).

In addition, the main ECU 6 sets a buzzer signal BS for emitting a buzzer sound from the warning device 30, and transmits the buzzer signal BS to the warning device 30. Furthermore, the main ECU 6 sets a display signal DS for providing a display of a warning on the multi-display 42 of the meter unit 40, and transmits the display signal DS to the meter unit 40.

A process in the main ECU 6 with execution of the control of the lane-keep assist function will be described with reference to FIG. 4. The lane-keep assist function adds a steering force to the steering system by making use of the electric power steering 20 so as to keep the vehicle traveling near the center of the lane. This steering force is a relatively small steering force enough to assist the steering force by the driver, and is set according to the radius of curvature of the lane, the angular difference between the vehicle and the center line of the lane, and the offset amount. The steering force added is a small steering force enough to assist the driver's steering force, and thus the vehicle can depart from the lane, depending upon the driver's steering force.

When the lane-keep assist function determines that the vehicle cannot keep traveling within the lane, it performs an emission of a buzzer sound from the warning device 30 and a display of a warning on the multi-display 42 of the meter unit 40. In FIG. 4, a dashed arrow indicates a vehicular swept path of the vehicle with addition of the steering force by the lane-keep assist function. In this case, the vehicle, having been traveling near the edge of the lane, comes to travel near the center line of the lane (chain line) with addition of the steering force toward the right. On this occasion, the steering force by the driver's steering operation also acts on the vehicle.

For that purpose, the main ECU 6 calculates the magnitude and the steering direction of the additional steering torque, based on the angular difference of the direction of the camera 2 (i.e., the traveling direction of the vehicle) relative to the center line of the lane, the offset amount of the vehicle from the center line of the lane, and the curvature of the lane, on the basis of the image signal GS. On this occasion, the additional steering torque increases with increase in the angular difference, the offset amount, and the curvature. In the calculation of the magnitude of the steering torque, the angular difference, the offset amount, and the curvature are multiplied by their respective gains, and the additional steering torque increases with increase in the gains. By increasing each of these gains, therefore, it becomes feasible to make the vehicle travel near the center of the lane, without the driver's steering force. The main ECU 6 sets a steering torque signal TS indicating the steering torque obtained by the calculation, and transmits the steering torque signal TS to the electric power steering 20 (steering ECU 21).

In addition, the main ECU 6 determines whether the vehicle can keep traveling within the lane, from the mutual relation between the direction of the camera 2 and the direction of the pair of white lines, in consideration of the radius of curvature of the center line of the lane and the width of the lane, on the basis of the image signal GS. When it is determined that the vehicle cannot keep traveling within the lane, the main ECU 6 sets a buzzer signal BS for emitting a buzzer sound from the warning device 30, and transmits the buzzer signal BS to the warning device 30. In addition, the main ECU 6 sets a display signal DS for providing a display of a waning on the multi-display 42 of the meter unit 40, and transmits the display signal DS to the meter unit 40.

Processes of providing the contents of the display on the multi-display 42 by the main ECU 6 will be described with reference to FIGS. 5 to 9. When the lane keeping device 1 is inactive, the multi-display 42 displays neither the two white lines nor the steering wheel mark (FIG. 6), and thus the main ECU 6 sets the display signal DS to indicate that the lane keeping device 1 is inactive. When the lane-keep assist function is active, the multi-display 42 displays the two white lines and the steering wheel mark (FIG. 9), and thus the main ECU 6 sets the display signal DS to indicate that the lane-keep assist function is active. In addition, when the lane departure warning function is active, the multi-display 42 displays the two white lines (FIG. 7), and thus the main ECU 6 sets the display signal DS to indicate that the lane departure warning function is active.

Figure 10:
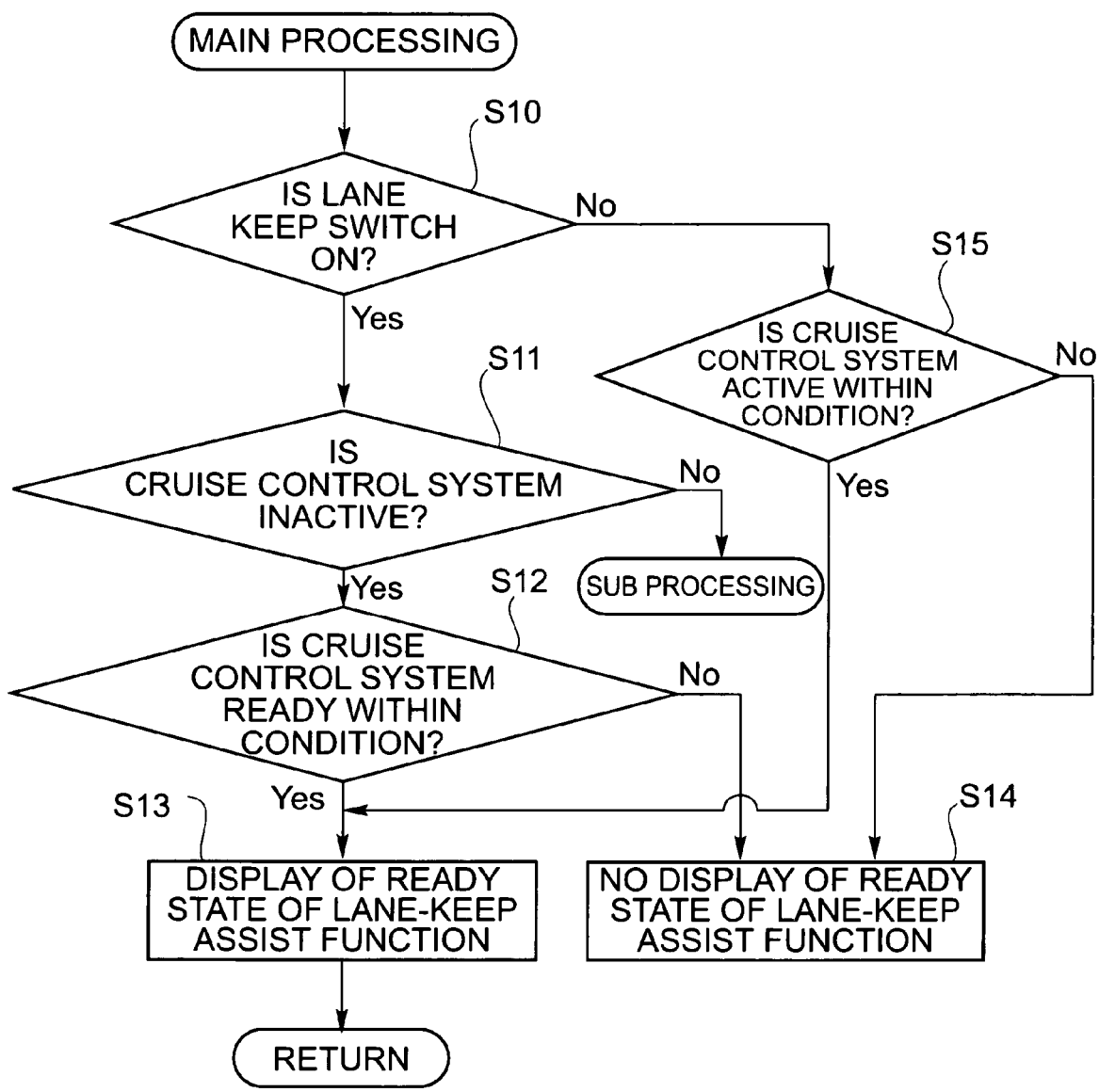
FIG. 10 is a flowchart showing a control of displaying the ready state of the lane-keep assist function (main processing).

The main ECU 6 determines whether the lane keep switch 5 is on or off, based on the switch signal WS [FIG. 10: step 10]. When the lane keep switch 5 is on [FIG. 10: step 10-Yes], the main ECU 6 determines whether the cruise control system 10 is active or inactive, based on the cruise control signal CS [FIG. 10: step 11]. The phrase "within or outside the condition" will be used hereinafter, and "within the condition" refers to a state in which the lane-keep assist function can be activated by a certain operation on the cruise control system 10 (a switch-on operation, RESUME, or the like). When the cruise control system 10 is inactive [FIG. 10: step 11-Yes], the main ECU 6 determines whether the cruise control system 10 is in a ready state within the condition, based on the cruise control signal CS [FIG. 10: step 12].

When the cruise control system 10 is in the ready state within the condition [FIG. 10: step 12-Yes], the main ECU 6 sets the display signal DS indicating the ready state of the lane-keep assist function [FIG. 10: step 13], in order to indicate the READY mark on the multi-display 42 (FIG. 8B). On the other hand, when the cruise control system 10 is not in the ready state within the condition [FIG. 10: step 12-No], the main ECU 6 sets the display signal DS indicating that the lane-keep assist function is not in the ready state [FIG. 10: step 14], in order not to display the READY mark on the multi-display 42.

The below will describe the state in which the cruise control system 10 is in the ready state within the condition with the lane keeping device 1 being active and with the cruise control system 10 being inactive [FIG. 10: step 12-Yes]. When the lane departure warning function of the lane keeping device 1 is active and when the cruise control system 10 is inactive (canceled), the lane-keep assist function is activated with activation of the cruise control system 10 where a driver's operation brings the set vehicle speed Vset of the cruise control into the activation permitting speed range of the lane-keep assist function (i.e., when the set vehicle speed Vset becomes not less than V3 and not more than V4). Namely, the lane-keep assist function is activated when the vehicle speed V falls within the activation permitting speed range of the lane-keep assist function and when the cruise control system 10 is started by an on operation on the cruise control switch 13 (when the target vehicle speed Vset is set within the activation permitting speed range of the lane-keep assist function). In another situation, the lane-keep assist function is activated when the set vehicle speed Vset before canceling of the cruise control system 10 is within the activation permitting speed range of the lane-keep assist function and when the cruise control system 10 is resumed by the RESUME operation on the cruise control switch 13.

On the other hand, when the lane keep switch 5 is off [FIG. 10: step 10-No], the main ECU 6 determines whether the cruise control system 10 is active within the condition, based on the cruise control signal CS [FIG. 10: step 15]. When the cruise control system 10 is active within the condition [FIG. 10: step 15-Yes], the main ECU 6 sets the display signal DS to indicate that the lane-keep assist function is in the ready state [FIG. 10: step 13], in order to display the READY mark on the multi-display 42 (FIG. 8A). On the other hand, when the cruise control system 10 is not active within the condition [FIG. 10: step 15-No], the main ECU 6 sets the display signal DS to indicate that the lane-keep assist function is not in the ready state, in order not to display the READY mark on the multi-display 42 [FIG. 10: step 14].

The below will describe the state in which the cruise control system 10 is active within the condition with the lane keeping device 1 being inactive and with the cruise control system 10 being active [FIG. 10: step 15-Yes]. The lane-keep assist function is activated with activation of the lane keeping device 1 by a driver's operation when the lane keeping device 1 is inactive and when the cruise control system 10 is active with the set vehicle speed Vset of the cruise control being within the activation permitting speed range of the lane-keep assist function (the set vehicle speed Vset being not less than V3 and not more than V4). Namely, the lane-keep assist function is activated when the lane keeping device 1 is started by an on operation on the lane keep switch 5.

The following will describe a state in which the cruise control system 10 is active outside the condition with the lane keeping device 1 being inactive and with the cruise control system 10 being active [FIG. 10: step 15-No]. When the lane keeping device 1 is inactive and when the cruise control system 10 is active with the set vehicle speed Vset of the cruise control being off the activation permitting speed range of the lane-keep assist function (the set vehicle speed being less than V3 or higher than V4), the lane departure warning function is activated or is kept inactive if the lane keeping device 1 is activated by a driver's operation. Namely, the lane-keep assist function cannot be activated even if the lane keeping device 1 is started by an on operation on the lane keep switch 5.

Figure 11:
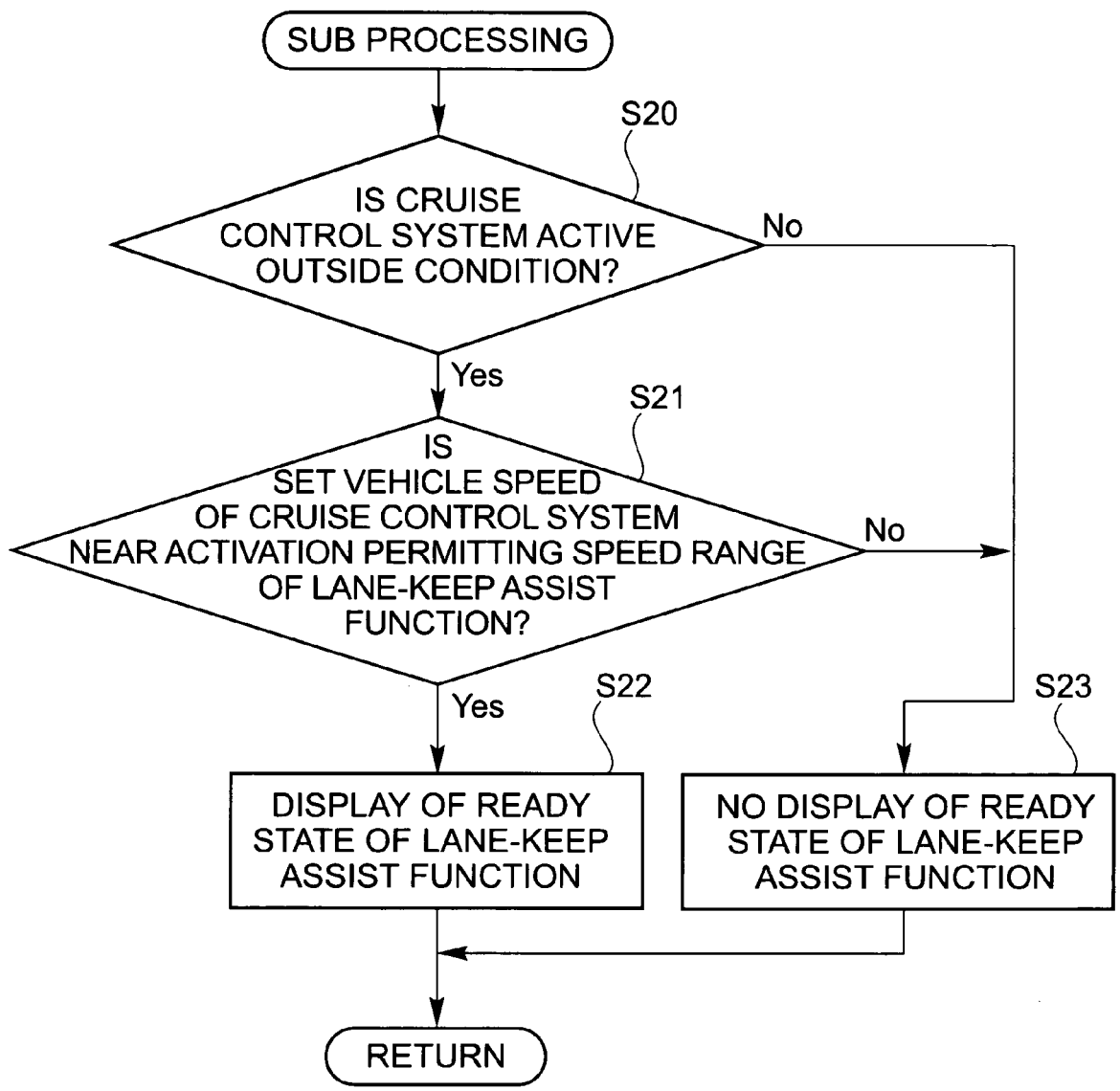
FIG. 11 is a flowchart showing the control of displaying the ready state of the lane-keep assist function (sub-processing).

When the lane keep switch 5 is on and when the cruise control system 10 is active [FIG. 10: step 11-No], the main ECU 6 determines whether the cruise control system 10 is active outside the condition, based on the cruise control signal CS [FIG. 11: step 20]. When the cruise control system 10 is active within the condition [FIG. 11: step 20-No], the lane-keep assist function is already activated, and thus the main ECU 6 sets the display signal DS to indicate that the lane-keep assist function is not in the ready state (already started), in order not to display the READY mark on the multi-display 42 [FIG. 11: step 23]. The state in which the cruise control system 10 is active outside the condition means a state in which the cruise control system 10 is active with the set vehicle speed Vset of the cruise control being off the activation permitting speed range of the lane-keep assist function (i.e., with the set vehicle speed being less than V3 or higher than V4).

When the cruise control system 10 is active outside the condition [FIG. 11: step 20-Yes], the main ECU 6 determines whether the set vehicle speed Vset of the cruise control is near the activation permitting speed range of the lane-keep assist function (i.e., whether the set vehicle speed is less than V3 but near V3, or higher than V4 but near V4), based on the cruise control signal CS [FIG. 11: step 21]. When the set vehicle speed Vset of the cruise control is near the activation permitting speed range of the lane-keep assist function [FIG. 11: step 21-Yes], the main ECU 6 sets the display signal DS to indicate that the lane-keep assist function is in the ready state [FIG. 11: step 22], in order to display the READY mark on the multi-display 42 (FIG. 8C). On the other hand, when the set vehicle speed Vset of the cruise control is not near the activation permitting speed range of the lane-keep assist function [FIG. 11: step 21-No], the main ECU 6 sets the display signal DS to indicate that the lane-keep assist function is not in the ready state [FIG. 11: step 23], in order not to display the READY mark on the multi-display 42.

The below will describe a state in which the cruise control system 10 is active outside the condition with the lane keeping device 1 being active and with the cruise control system 10 being active [FIG. 11: step 20-Yes]. When the lane keeping device 1 is active and when the cruise control system 10 is active with the set vehicle speed Vset of the cruise control being off the activation permitting speed range of the lane-keep assist function, the lane-keep assist function will be activated if the set vehicle speed Vset is set into the activation permitting speed range of the lane-keep assist function by a driver's operation. Namely, the lane-keep assist function is activated when the driver performs a speed change operation on the cruise control switch 13 to increase or decrease the set vehicle speed Vset into the activation permitting speed range of the lane-keep assist function. Since the driver determines the set speed in consideration of the surrounding driving conditions and the speed limit, the driver is highly possibly unable to largely change the set vehicle speed Vset. Therefore, the READY mark is displayed only when the set vehicle speed Vset is near the activation permitting speed range of the lane-keep assist function [FIG. 11: step 21-Yes].

The vehicle speed near the activation permitting speed range of the lane-keep assist function is set on the basis of the concept as described below. When the driver sets the vehicle speed of the cruise control, a speed region corresponding to a set speed width that can be changed by a single operation becomes a near region to the activation permitting speed range. Therefore, for example, where the vehicle is provided with a speed setting means arranged to change the set vehicle speed stepwise by a single operation, a speed width of one step of the setting means is the near region to the activation permitting speed range; where the vehicle is provided with a speed setting means for gradually changing the set vehicle speed against an operation, a speed width sensed as a single operation by the driver is the near region to the activation permitting speed range.

The operation of the lane keeping device 1 will be described with reference to FIG. 1. Particularly, the determination on the ready state of the lane-keep assist function in the display content processing by the main ECU 6 will be described along the flowchart of FIG. 10 as to the main processing thereof and will be described along the flowchart of FIG. 11 as to the sub-processing. FIG. 10 is a flowchart showing the main processing of the determination on the ready state of the lane-keep assist function in the display content processing by the main ECU in FIG. 1. FIG. 11 is a flowchart showing the sub-processing.

The camera 2 takes an image of a forward road ahead the vehicle, and transmits data of the photographic image as a photograph signal PS to the image ECU 3. The image ECU 3 recognizes a pair of white lines defining a lane, from the photographic image. Then the image ECU 3 calculates the lane width, the center line of the lane, and the radius of curvature and the curvature of the center line from the pair of white lines, and calculates the angular difference between the center line of the lane and the direction of the camera 2 and the offset amount of the vehicle from the center line of the lane. Furthermore, the image ECU 3 transmits these information about the pair of white lines and information calculated, as an image signal GS to the main ECU 6. The vehicle speed sensor 4 detects vehicle speed information and transmits the vehicle speed information as a vehicle speed signal SS to the main ECU 6. The lane keep switch 5 transmits information about on/off thereof as a switch signal WS to the main ECU 6.

The cruise control ECU 11 transmits information about on/off of the cruise control system 10 and information of the set vehicle speed Vset by the driver as a cruise control signal CS to the main ECU 6. The cruise control ECU 11 also transmits the information about activation/deactivation of the cruise control system 10 and the information of the set vehicle speed Vset as a display signal DS to the meter unit 40. The main ECU 6 determines whether the lane keep switch 5 is on, based on the switch signal WS. When the lane keep switch 5 is determined to be off, the main ECU 6 deactivates the lane keeping device 1. When the lane keep switch 5 is determined to be on, the main ECU 6 determines whether the cruise control system 10 is active, based on the cruise control signal CS.

When it is determined that the cruise control system 10 is active, the main ECU 6 determines whether the set vehicle speed Vset of the cruise control is within the activation permitting speed range of the lane-keep assist function, based on the cruise control signal CS. When the cruise control system 10 is active, the vehicle is automatically adjusted so that the vehicle speed V becomes the set vehicle speed Vset, and thus the determination herein is made using the set vehicle speed Vset. When the set vehicle speed Vset is determined to be within the activation permitting speed range of the lane-keep assist function, the main ECU 6 activates the lane-keep assist function. On the other hand, when the set vehicle speed Vset is determined to be off the activation permitting speed range of the lane-keep assist function, the main ECU 6 determines whether the set vehicle speed is within the activation permitting speed range of the lane departure warning function, based on the cruise control signal CS. When the set vehicle speed is determined to be within the activation permitting speed range of the lane departure warning function, the main ECU 6 activates the lane departure wanting function. When the set vehicle speed is determined to be off the activation permitting speed range of the lane departure warning function, the main ECU 6 deactivates the lane keeping device 1. The determination herein is also made using the set vehicle speed Vset.

On the other hand, when the cruise control system 10 is determined to be inactive (stopped), the main ECU 6 determines whether the vehicle speed V is within the activation permitting speed range of the lane departure warning function, based on the vehicle speed signal SS. When the vehicle speed V is determined to be within the activation permitting speed range of the lane departure warning function, the main ECU 6 activates the lane departure warning function. When the vehicle speed is determined to be off the activation permitting speed range of the lane departure warning function, the main ECU 6 deactivates the lane keeping device 1. When the lane keeping device 1 is deactivated, the main ECU 6 sets the display signal DS to indicate the stop of the lane keeping device 1, and transmits the display signal DS to the meter unit 40. When receiving this display signal DS, the meter unit 40 displays neither the two white lines nor the steering wheel mark on the multi-display 42 (FIG. 6).

In activating the lane departure warning function, the main ECU 6 sets the display signal DS to indicate activation of the lane departure warning function, and transmits the display signal DS to the meter unit 40. When receiving this display signal DS, the meter unit 40 displays the two white lines on the multi-display 42 but does not display the steering wheel mark (FIG. 7). In activating the lane-keep assist function, the main ECU 6 sets the display signal DS to indicate activation of the lane-keep assist function, and transmits the display signal DS to the meter unit 40. When receiving this display signal DS, the meter unit 40 displays the two white lines and the steering wheel mark on the multi-display 42 (FIG. 9). The driver becomes aware that the lane departure warning function or the lane-keep assist function is active or inactive, with or without the display of the two white lines and the steering wheel mark on the multi-display 42.

Furthermore, the main ECU 6 determines whether the lane keep switch 5 is on, based on the switch signal WS (step 10). When it is determined at step 10 that the lane keep switch 5 is on, the main ECU 6 determines whether the cruise control system 10 is inactive (stopped), based on the cruise control signal CS (step 11). When it is determined at step 11 that the cruise control system 10 is active, the main ECU 6 goes to the sub-processing. The sub-processing will be described later.

On the other hand, when it is determined at step 11 that the cruise control system 10 is inactive, the main ECU 6 determines whether the cruise control system 10 is ready to be activated within the condition, based on the cruise control signal CS (step 12). The determination on whether the cruise control system is ready to be activated within the condition is made based on whether the activation start condition of the lane-keep assist function is met in the active state of the cruise control. When it is determined at step 12 that the cruise control system 10 is ready within the condition, the main ECU 6 determines that the lane-keep assist function is in the ready state.

Then the main ECU 6 sets the display signal DS to indicate the ready state of the lane-keep assist function, and transmits the display signal DS to the meter unit 40. When receiving this display signal DS, the meter unit 40 displays the READY mark on the multi-display 42 (step 13). Since the present status is that the lane departure warning function is active, the cruise control system 10 is inactive, and the lane-keep assist function is in the ready state, as shown in FIG. 8B, the two white lines and the READY mark are displayed on the multi-display 42. The driver becomes aware that the lane-keep assist function can be activated by an on operation or a RESUME operation on the cruise control switch 13, through the contents of the display on the multi-display 42.

When it is determined at step 12 that the cruise control system 10 is not ready to be activated within the condition, the main ECU 6 determines that the lane-keep assist function is not in the ready state. Then the main ECU 6 sets the display signal DS to indicate that the lane-keep assist function is not in the ready state, and transmits the display signal DS to the meter unit 40. When receiving this display signal DS, the meter unit 40 does not display the READY mark on the multi-display 42 (step 14). In this case, since the READY mark is not displayed on the multi-display 42, the driver becomes aware that the lane-keep assist function cannot be activated by only an on operation or a RESUME operation on the cruise control switch 13.

When it is determined at step 10 that the lane keep switch 5 is off, the main ECU 6 determines whether the cruise control system 10 is active within the condition, based on the cruise control signal CS (step 15). The determination on whether the cruise control system is active within the condition is made based on whether the present cruise control satisfies the activation start condition of the lane-keep assist function. When it is determined at step 15 that the cruise control system 10 is active within the condition, the main ECU 6 determines that the lane-keep assist function is in the ready state, sets the display signal DS to indicate the ready state of the lane-keep assist function, and transmits it to the meter unit 40. When receiving the display signal DS, the meter unit 40 displays the READY mark on the multi-display 42 (step 13).

In this case, since the present status is that the lane keeping device 1 is inactive, the cruise control system 10 is active, and the lane-keep assist function is in the ready state, as shown in FIG. 8A, the cruise control mark, the set vehicle speed Vset, and the READY mark are displayed on the multi-display 42. The driver becomes aware that the lane-keep assist function can be activated by an on operation on the lane keep switch 5, through the display contents on the multi-display 42.

On the other hand, when it is determined at step 15 that the cruise control system 10 is not active within the condition, the main ECU 6 determines that the lane-keep assist function is not in the ready state, sets the display signal DS to indicate that the lane-keep assist function is not in the ready state, and transmits it to the meter unit 40. When receiving this display signal DS, the meter unit 40 does not display the READY mark on the multi-display 42 (step 14). In this case, since the READY mark is not displayed on the multi-display 42, the driver becomes aware that the lane-keep assist function cannot be activated by only an on operation on the lane keep switch 5.

The aforementioned sub-processing will be described. When the lane keep switch 5 is on and when the cruise control system 10 is active, the main ECU 6 determines whether the cruise control system 10 is active outside the condition, based on the cruise control signal CS (step 20). When it is determined at step 20 that the cruise control system 10 is not active outside the condition, the lane-keep assist function is already active and thus the main ECU 6 sets the display signal DS to indicate that the lane-keep assist function is not in the ready state (already started), in order not to display the READY mark, and transmits it to the meter unit 40. When receiving this display signal DS, the meter unit 40 does not display the READY mark on the multi-display 42 (step 23). In this case, the lane-keep assist function is already active.

When it is determined at step 20 that the cruise control system 10 is active outside the condition, the main ECU 6 determines whether the set vehicle speed Vset of the cruise control is near the activation permitting speed range of the lane-keep assist function, based on the cruise control signal CS (step 21). When it is determined at step 21 that the set vehicle speed Vset is near the activation permitting speed range of the lane-keep assist function, the main ECU 6 determines that the lane-keep assist function is in the ready state, sets the display signal DS to indicate that the lane-keep assist function is in the ready state, and transmits it to the meter unit 40. When receiving this display signal DS, the meter unit 40 displays the READY mark on the multi-display 42 (step 22).

In this case, since the present status is that the lane keeping device 1 and the cruise control system 10 are active and the lane-keep assist function is in the ready state, as shown in FIG. 8C, the cruise control mark, the set vehicle speed Vset, the two white lines, and the READY mark are displayed on the multi-display 42. The driver becomes aware that the lane-keep assist function can be activated by a set speed changing operation on the cruise control switch 13, through the display contents on the multi-display 42.

When it is determined at step 21 that the set vehicle speed Vset of the cruise control is not near the activation permitting speed range of the lane-keep assist function, the main ECU 6 determines that the lane-keep assist function is not in the ready state, sets the display signal DS to indicate that the lane-keep assist function is not in the ready state, and transmits it to the meter unit 40. When receiving this display signal DS, the meter unit 40 does not display the READY mark on the multi-display 42 (step 23). In this case, since the READY mark is not displayed on the multi-display 42, the driver becomes aware that the lane-keep assist function cannot be activated unless the set speed is largely changed on the cruise control switch 13.

As described above, the READY mark is displayed for the driver when the lane-keep assist function can be activated by a driver's operation out of the on operation or RESUME operation on the cruise control switch 13, the on operation on the lane keep switch 5, and the speed changing operation on the cruise control switch 13 for satisfying the activation start condition of the lane-keep assist function; this permits the driver to become aware of the present status of capability of shifting to the lane-keep assist function.

When the lane departure warning function is activated, the main ECU 6 determines whether the vehicle can depart from the lane, based on the image signal GS. When it is determined that the vehicle can depart from the lane, the main ECU 6 transmits the steering torque signal TS indicating the steering torque for generating the steering force at the body-sensory warning level, to the steering ECU 21. The main ECU 6 also transmits the buzzer signal BS for issuing a buzzer sound, to the warning device 30, and transmits the display signal DS for providing a display of a warning on the multi-display 42 of the meter unit 40, to the meter unit 40.

The electric power steering 20 sets the assist amount by adding the steering torque indicated by the steering torque signal TS, to the steering torque given by the driver, and drives the electric motor 22 according to the assist amount. Then the small steering force by the control of the lane keeping device 1 acts on the vehicle for a short period of time to direct the vehicle slightly toward the center of the lane. In addition, the warning device 30 issues the buzzer sound. Further-more, the meter unit 40 displays the warning on the multi-display 42. In consequence, the driver becomes aware that the vehicle can depart from the lane, through the steering force at the body-sensory warning level, the buzzer sound, and/or the warning display.

When the lane-keep assist function is activated, the main ECU 6 calculates the magnitude and direction of the steering force to be added for keeping the vehicle traveling near the center of the lane, based on the image signal GS. Then the main ECU 6 transmits the steering torque signal TS indicating the steering torque determined by the calculation, to the steering ECU 21. The electric power steering 20 sets the assist amount by adding the steering torque indicated by the steering torque signal TS, to the steering torque given by the driver, and drives the electric motor 22 according to the assist amount. Then the relatively small steering force by the control of the lane keeping device 1 continuously acts on the vehicle to continuously direct the vehicle toward the center of the lane.

The main ECU 6 determines whether the vehicle can keep traveling within the lane, based on the image signal GS. When it is determined that the vehicle cannot keep traveling within the lane, the main ECU 6 transmits the buzzer signal BS for an issue of a buzzer sound, to the warning device 30, and transmits the display signal DS for providing a display of a warning on the multi-display 42 of the meter unit 40, to the meter unit 40. The warning device 30 issues the buzzer sound. Furthermore, the meter unit 40 displays the warning on the multi-display 42. In consequence, the driver becomes aware that the vehicle cannot travel within the lane, through the buzzer sound and/or the warning display.

This lane keeping device 1 permits the driver to readily know whether the lane-keep assist function is in the ready state, with or without the display of the READY mark on the multi-display 42. Furthermore, since the lane keeping device 1 is configured to provide display/no display of the two white lines, the cruise control mark, and the set vehicle speed on the multi-display 42, the driver is able to readily know by which operation the lane-keep assist function can be activated, with the display of the READY mark. In addition, the lane keeping device 1 provides the additional display/no display of the steering wheel mark in addition to the display of the two white lines on the multi-display 42, whereby the driver is able to readily identify which one of the lane departure warning function and the lane-keep assist function is active.

The above described the embodiment of the present invention, but the present invention can be carried out in various forms without being limited to the above embodiment. For example, the present embodiment was configured to notify the driver that the vehicle can depart from the lane, by the addition of the steering force at the body-sensory warning level, the issue of the buzzer sound, and the warning display. However, it is also possible to adopt a configuration wherein the driver is notified by one of them, or to adopt a configuration wherein the driver is notified by any other method such as an issue of a voice message. In addition, the present embodiment was configured to notify the driver that the vehicle cannot keep traveling within the lane, by the issue of the buzzer sound and the warning display. However, it is also possible to adopt a configuration wherein the driver is notified by one of them, or to adopt a configuration wherein the driver is notified by any other method such as an issue of a voice message. Another potential configuration is that in a case where the vehicle cannot keep traveling within the lane, a larger steering force than normal (instead of the relatively small steering force) is added to keep the vehicle traveling within the lane.

The present embodiment was configured to add the steering force to the steering system by making use of the electric power steering, but it is also possible to adopt a configuration wherein the lane keeping device is provided with an actuator for assisting a rack and a pinion. This permits the present invention to also be applied to vehicles without the power steering system. The present invention can also be applied to power steering systems of the hydraulic type, as well as the electric power steering, and the apparatus may be configured to add the steering force to the steering system by controlling an actuator for regulating the hydraulic pressure. In addition, the apparatus was configured to perform the control based on the steering torque, but the apparatus may also be configured to perform the control based on another parameter such as a steer angle.

The present embodiment was the application of the invention to the lane keeping device having the lane-keep assist function and the lane departure warning function, but the present invention can be applied to any lane keeping device having at least the lane-keep assist function. The present embodiment was configured to detect the lane by recognition of the pair of white lines, but the apparatus may also be configured to detect the lane by also recognizing other lines such as yellow lines, except for the white lines. Alternatively, the lane may be detected by any other method such as a method of detecting the lane by recognizing road shoulders, blocks defining a lane from a sidewalk, or the like. The present embodiment was an example of the application to roads with a lane, but the present invention can also be applied to roads without a lane. In this case, the apparatus may be configured to detect a road shoulder or the like of the road.

The present embodiment was configured to display the working situations of the lane keeping device and the cruise control system (particularly, the ready state of the lane-keep assist function) on the multi-display of the combination meter, but the apparatus may also be configured to display such indications on a multi-display being a display part of a television monitor or a navigation system, to use various lamps to display the working situations by their lighting states, or to display the working situations by any other display means.

The present embodiment was configured to indicate the activation of the lane-keep assist function, the activation of the lane departure warning function, the ready state of the lane-keep assist function, and the activation of the cruise control system through the use of the symbols having the predetermined shapes, but the apparatus may also be configured to indicate them by characters, by colors, and/or by any other identification display. The present embodiment was configured to display the READY mark only when the set vehicle speed of the cruise control system was near the activation permitting speed range of the lane-keep assist function, but the apparatus may also be configured to display the READY mark even if the set vehicle speed is not near the activation permitting speed range of the lane-keep assist function.

What is claimed is:

1. A driving control apparatus comprising:
   driving road keeping means for providing a torque to a steering mechanism so as to keep a vehicle traveling at a predetermined position on a driving road;
   setting means for setting a need or no need for execution of a control of the driving road keeping means; and
   cruise control means for controlling a driving force or speed of the vehicle so as to keep the vehicle in a predetermined driving state,
   wherein a need or no need for execution of the control of the driving road keeping means is determined based on a setting state of the setting means and a control state of the cruise control means, and
   wherein when the control of the driving road keeping means is in an executable state upon a state change of either (1) the setting state of the setting means or (2) the control state of the cruise control means, a display indicating a ready state of the control of the driving road keeping means is presented.

2. The driving control apparatus according to claim 1, wherein the executable state of the control of the driving road keeping means upon the state change of either (1) the setting state of the setting means or (2) the control state of the cruise control means, is (a) a state (i) in which the setting means selects a need for execution of the control of the driving road keeping means and (ii) in which a setting switch for setting a need or no need for activation of the cruise control means is off, and (b) state in which the driving road keeping means is in the executable state with execution of the control of the cruise control means.

3. The driving control apparatus according to claim 1, wherein the executable state of the control of the driving road keeping means upon the state change of either (1) the setting state of the setting means or (2) the control state of the cruise control means, is (c) a state (i) in which the setting means selects a need for execution of the control of the driving road keeping means and (iii) in which the control of the cruise control means is inactive, and (b) state in which the driving road keeping means is in the executable state with execution of the control of the cruise control means.

4. The driving control apparatus according to claim 3, wherein the control of the driving road keeping means is one to be executed within an activation speed region and wherein the ready state of the control of the driving road keeping means is a state in which a target speed of the cruise control means is set within the activation speed region.

5. The driving control apparatus according to claim 1, wherein the executable state of the control of the driving road keeping means upon the state change of either (1) the setting state of the setting means or (2) the control state of the cruise control means, is (A) a state (iv) in which the setting means sets no need for execution of the control of the driving road keeping means and (v) in which the cruise control means is active, and (B) state in which the driving road keeping means is executable.

6. The driving control apparatus according to claim 5, wherein the control of the driving road keeping means is one to be executed within an activation speed region and wherein the ready state of the control of the driving road keeping means is a state in which a target speed of the cruise control means is set within the activation speed region.

7. The driving control apparatus according to claim 1, wherein the control of the driving road keeping means is one to be executed within an activation speed region, and wherein the executable state of the control of the driving road keeping means upon the state change of either (1) the setting state of the setting means or (2) the control state of the cruise control means, is (C) a state (i) in which the setting means sets a need for execution of the control of the driving road keeping means and (vi) in which a setting switch for setting a need or no need for activation of the cruise control means is on, and (D) state in which a target speed of the cruise control means is off the activation speed region.

8. The driving control apparatus according to claim 1, wherein the control of the driving road keeping means is one to be executed within an activation speed region, and wherein the executable state of the control of the driving road keeping means upon the state change of either (1) the setting state of the setting means or (2) the control state of the cruise control means, is (E) a state (i) in which the setting means sets a need for execution of the control of the driving road keeping means and (v) in which the control of the cruise control means is active, and (D) state in which a target speed of the cruise control means is off the activation speed region.

9. The driving control apparatus according to claim 8, wherein the target speed of the cruise control means is off the activation speed region and within a predetermined range from a threshold of the activation speed region.

10. A driving control method of performing driving road keeping control for providing a torque to a steering mechanism so as to keep a vehicle traveling at a predetermined position on a driving road and cruise control for controlling a driving force or speed of the vehicle so as to keep the vehicle in a predetermined driving state,
    wherein a need or no need for execution set by setting means for setting a need or no need for execution of a control of the driving road keeping control is determined based on a setting of the setting means and a control state of the cruise control, and
    wherein when the driving road keeping control is in an executable state upon a state change of either (1) the setting state of the setting means or (2) the control state of the cruise control, a display indicating a ready state of the driving road keeping control is presented.

11. The driving control method according to claim 10, wherein the executable state of the driving road keeping control upon the state change of either (1) the setting state of the setting means or (2) the control state of the cruise control, is (a) a state (i) in which the setting means selects a need for execution of the driving road keeping control and (ii) in which a setting switch for setting a need or no need for activation of the cruise control is off, and (b) state in which the driving road keeping control is in the executable state with execution of the cruise control.

12. The driving control method according to claim 10, wherein the executable state of the driving road keeping control upon the state change of either (1) the setting state of the setting means or (2) the control state of the cruise control, is (c) a state (i) in which the setting means selects a need for execution of the driving road keeping control and (iii) in which the control of the cruise control is inactive, and (b) state in which the driving road keeping control is in the executable state with execution of the cruise control.

13. The driving control method according to claim 12, wherein the driving road keeping control is one to be executed within an activation speed region and wherein the ready state of the driving road keeping control is a state in which a target speed of the cruise control is set within the activation speed region.

14. The driving control method according to claim 10, wherein the executable state of the driving road keeping control upon the state change of either (1) the setting state of the setting means or (2) the control state of the cruise control, is (A) a state (iv) in which the setting means sets no need for execution of the driving road keeping control and (v) in which the cruise control is active, and (B) state in which the driving road keeping control is executable.

15. The driving control method according to claim 14, wherein the driving road keeping control is one to be executed within an activation speed region and wherein the ready state of the driving road keeping control is a state in which a target speed of the cruise control is set within the activation speed region.

16. The driving control method according to claim 10, wherein the driving road keeping control is one to be executed within an activation speed region, and wherein the executable state of the driving road keeping control upon the state change of either (1) the setting state of the setting means or (2) the control state of the cruise control, is (C) a state (i) in which the setting means sets a need for execution of the driving road keeping control and (vi) in which a setting switch for setting a need or no need for activation of the cruise control is on, and (D) state in which a target speed of the cruise control is off the activation speed region.

17. The driving control method according to claim 10, wherein the driving road keeping control is one to be executed within an activation speed region, and wherein the executable state of the driving road keeping control upon the state change of either (1) the setting state of the setting means or (2) the control state of the cruise control, is (E) a state (i) in which the setting means sets a need for execution of the driving road keeping control and (v) in which the cruise control is active, and (D) state in which a target speed of the cruise control is off the activation speed region.

18. The driving control method according to claim 17, wherein the target speed of the cruise control is off the activation speed region and within a predetermined range from a threshold of the activation speed region.

* * * * *